W. HOF.
MEANS FOR DISTILLING ACIDS.
APPLICATION FILED SEPT. 29, 1913.
1,099,368.
Patented June 9, 1914.
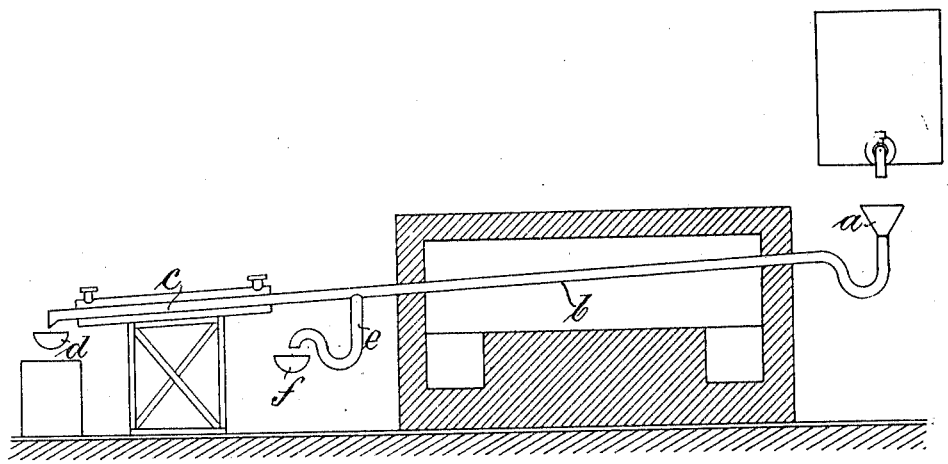
Witnesses:
M. H. Brakhagen
S. C. Denny
Inventor
Willy Hof.
by Foster Freeman
Attorney.

UNITED STATES PATENT OFFICE.

WILLY HOF, OF FRANKFORT-ON-THE-MAIN, GERMANY.

MEANS FOR DISTILLING ACIDS.

1,099,368.  Specification of Letters Patent.  Patented June 9, 1914.

Application filed September 29, 1913. Serial No. 792,454.

*To all whom it may concern:*

Be it known that I, WILLY HOF, subject of the German Emperor, residing at 4 Elkenbachstrasse, Frankfort-on-the-Main, Germany, have invented certain new and useful Improvements in Means for Distilling Acids, of which the following is a specification.

This invention relates to an improved means for distilling acids and is particularly applicable to the distillation of sulfuric acid.

Hitherto in the purification of acids such as sulfuric acid, the acid has been evaporated in glass or porcelain retorts and the vapors cooled in tubes of similar material. This method was, however, extremely difficult owing to breakage of the retorts and condenser and owing to the purification of the retorts from residues. Moreover, the fuel was badly utilized since the retorts had to be heated in sand baths. Violent ebullition of the liquid also occurred, thus frequently causing destruction of the vessels, while the condenser easily fractured on a sudden supply of larger quantities of vapor. Finally the closing of the retorts and the connection of the different parts gave rise to difficulties as the larger cemented joints were liable to leak in consequence of the different coefficients of heat and permit of the escape of larger quantities of unpleasant sulfuric acid vapors. The distilling plants required particularly great care in order to always maintain the retorts properly filled as the provision of a water gage was impossible. The use of quartz glass overcame these disadvantages in part in so far as the breakage through expansion and contraction was considerably diminished, but the arrangement hitherto used did not admit of continuous distillation.

By the use of tubular evaporating vessels of quartz glass or the like, a considerable advance in the distillation of acids may be obtained inasmuch as it is possible to construct an apparatus in which continuous distillation can be carried out without the danger of breakages. The use of tubular heating surfaces for evaporating apparatus is indeed not new *per se* but as a rule these tubular elements are entirely filled with liquid. By this means a violent ebullition takes place owing to the vapor bubbles in the tubes, which necessitates the provision of special vapor chambers for separating the liquid. Moreover, the impurities collect in considerable quantity in the evaporating space and can only be removed by the use of comparatively complicated apparatus. All these difficulties are however avoided in a very simple manner if the tubes are laid substantially horizontal or slightly inclined and only small quantities of liquid allowed to continuously trickle therethrough in such a manner that the greater part of the liquid is evaporated on passing through the tubes and if an outlet is provided at a suitable part of the tube for discharging the impurities and the unvaporized liquid, while the vapors pass along farther direct to the condensing tube and are condensed therein.

In the accompanying drawings such an arrangement is diagrammatically illustrated by way of example.

The liquid to be purified enters at $a$ and is evaporated in the tube $b$, the vapors condensing in the tube $c$. A channel $d$ collects the condensed liquid from a row of parallel tubes and conveys the liquid to a collecting vessel. The impurities escape at $e$ together with the impure liquid and are collected in the channel $f$. After the impurities are separated from the acid the rest of the acid is again returned for distillation.

Any kind of fuel may be utilized for heating purposes but preferably oil fuel should be employed or electric heating where the current is cheap, since a perfectly uniform supply of heat is thereby insured and the liquid to be distilled and which is uniformly supplied is also entirely uniformly converted into vapor.

A particular advantage of the present arrangement is that when the supply of heat varies, pure acid will always be obtained, since the excess supply of impure acid escapes from the apparatus at $e$. It was indeed to be feared that with the poor conductivity of heat and the extremely small heating surface, the evaporating yield would be too small, but it has been found on the contrary that considerable quantities of liquid can be evaporated up to 1000 kilograms of sulfuric acid per square centimeter of tubular surface in 24 hours, so that the efficiency is great with comparatively small plants. The proposed arrangement is also a great improvement since it is possible in the first place with reliability to so lay the tubes, that internal strains due to the unequal expansion of the quartz glass and masonry cannot take place, which is for ex ample impossible when using retorts and condenser worms, and moreover joints in the apparatus can be entirely obviated or limited to small spigot and socket joints. As a perfect jointing material for quartz glass has not hitherto been found it is very important that large joints should be obviated which would permit the vapors to escape and by driving out the cement give rise to fracture of the cemented quartz glass parts.

I claim:—

1. An apparatus for distilling acid comprising a highly refractory tube positioned so that acid continuously supplied thereto at one end will trickle therethrough, means for heating a portion of said tube adjacent its supply end, the tube being provided at an intermediate point in its length with an outlet for discharging unvaporized liquid and impurities, and a condenser for the liquid vaporized in the heated section of the tube and passing said outlet.

2. An apparatus for distilling acid comprising a highly refractory tube positioned so that acid continuously supplied thereto at one end will trickle therethrough, means for heating a portion of said tube adjacent its supply end, the tube being provided at an intermediate point in its length with an outlet for discharging unvaporized liquid and impurities, and means for cooling the tube beyond said outlet.

3. An apparatus for distilling acid comprising a highly refractory tube of quartz glass positioned so that acid continuously supplied at one end will trickle therethrough, means for heating a portion of said tube adjacent its supply end, the tube having beyond the portion thus heated an outlet for discharging unvaporized liquid and impurities, and a condenser for the liquid vaporized in the tube and passing said outlet.

4. An apparatus for distilling acid comprising a highly refractory tube of highly acidic glass of the nature of quartz glass positioned so that acid continuously supplied at one end will trickle therethrough, means for heating a portion of said tube adjacent its supply end, the tube having beyond the portion thus heated an outlet for discharging unvaporized liquid and impurities, and a condenser for the liquid vaporized in the tube and passing said outlet.

5. An apparatus for distilling acid comprising a highly refractory tube of quartz glass positioned so that acid continuously supplied at one end will trickle therethrough, means for heating a portion of said tube, the latter having beyond said heated portion an outlet for discharging unvaporized liquid and impurities, and means for cooling a portion of the tube beyond said outlet, to condense the liquid vaporized in passing through the heated section of the tube.

In testimony whereof I have affixed my signature in presence of two witnesses.

WILLY HOF.

Witnesses:
 CARL BÜHRINGER,
 JEAN GRUND.